(12) United States Patent
Henry

(10) Patent No.: US 10,161,834 B1
(45) Date of Patent: Dec. 25, 2018

(54) METHOD TO DETERMINE PERFORMANCE OF A CHILLER AND CHILLER PLANT

(71) Applicant: William R Henry, San Jose, CA (US)

(72) Inventor: William R Henry, San Jose, CA (US)

( * ) Notice: Subject to any disclaimer, the term of this patent is extended or adjusted under 35 U.S.C. 154(b) by 124 days.

(21) Appl. No.: 15/294,483

(22) Filed: Oct. 14, 2016

Related U.S. Application Data

(60) Provisional application No. 62/291,887, filed on Feb. 5, 2016.

(51) Int. Cl.
| | |
|---|---|
| *F25B 39/04* | (2006.01) |
| *G01M 99/00* | (2011.01) |
| *F24F 3/06* | (2006.01) |
| *G06F 17/50* | (2006.01) |
| *F24F 11/30* | (2018.01) |
| *F24F 11/46* | (2018.01) |
| *F25B 49/02* | (2006.01) |

(52) U.S. Cl.
CPC ............. *G01M 99/005* (2013.01); *F24F 3/06* (2013.01); *F24F 11/30* (2018.01); *G06F 17/5086* (2013.01); *F24F 11/46* (2018.01); *F25B 49/02* (2013.01); *F25B 2400/21* (2013.01); *G06F 2217/80* (2013.01)

(58) Field of Classification Search
CPC .......... G01M 99/005; F24F 11/30; F24F 3/06; F24F 11/0009; F24F 11/46; F24F 2011/0075; G06F 17/5086; G06F 2217/80; F25B 2400/21
See application file for complete search history.

(56) References Cited

U.S. PATENT DOCUMENTS

| | | | |
|---|---|---|---|
| 4,325,223 A | 4/1982 | Cantley | |
| 4,507,930 A | 4/1985 | Kaya | |
| 4,768,346 A | 9/1988 | Mathur | |
| 5,083,438 A * | 1/1992 | McMullin | G01L 3/26 165/11.1 |
| 5,600,960 A * | 2/1997 | Schwedler | F25B 49/027 62/185 |
| 5,651,264 A * | 7/1997 | Lo | F24F 3/065 62/230 |
| 5,963,458 A * | 10/1999 | Cascia | F25B 49/02 165/200 |
| 6,192,694 B1 * | 2/2001 | Hiro | F25B 15/008 62/141 |

(Continued)

OTHER PUBLICATIONS

Ashrae Guideline 22-2012—Instrumentation for Monitoring Central Chilled Water Plant, ISSN 1049-894X.

*Primary Examiner* — Michael C Zarroli

(57) ABSTRACT

A chiller and chiller plant monitoring method that provides real time performance and benchmark parameters using condenser water temperatures and flow rates to determine crucial performance metrics. A customized chiller model developed with algorithms to make comparative analysis for different operating scenarios. By applying a customized model for the supporting equipment, the entire plant can be monitored for performance. Actual operational metrics are compared with bench mark models to provide real time analysis of energy demand. The model also produces a control formula for condenser water reset. And defining the plant as a chilled water production system separate from the distribution system allows comparison with many with dissimilar operations.

9 Claims, 15 Drawing Sheets

(56) References Cited

U.S. PATENT DOCUMENTS

| | | | | |
|---|---|---|---|---|
| 6,718,779 B1* | 4/2004 | Henry | ............... | F25B 49/027 |
| | | | | 62/183 |
| 7,599,759 B2* | 10/2009 | Zugibe | ............... | F25B 49/02 |
| | | | | 700/275 |
| 7,945,423 B2 | 5/2011 | Seigel | | |
| 8,316,658 B2 | 11/2012 | Singh | | |
| 8,322,155 B2 | 12/2012 | Tutunoglu | | |
| 8,393,169 B2 | 3/2013 | Pham | | |
| 8,406,929 B2* | 3/2013 | Duncan | ............ | F24F 5/0035 |
| | | | | 700/277 |
| 8,424,322 B2 | 4/2013 | Seki | | |
| 8,615,371 B2 | 12/2013 | Hegar | | |
| 8,660,702 B2* | 2/2014 | Raghavachari | ........ | G05B 15/02 |
| | | | | 700/276 |
| 8,774,978 B2* | 7/2014 | Higgins | ............ | G06Q 10/06 |
| | | | | 700/295 |
| 9,612,601 B2* | 4/2017 | Beyhaghi | .......... | G05D 23/1917 |
| 2005/0223720 A1 | 10/2005 | Miller | | |
| 2009/0094998 A1 | 4/2009 | McSweeney | | |
| 2011/0023503 A1 | 2/2011 | Wang | | |
| 2013/0031920 A1 | 2/2013 | Tegano | | |
| 2015/0345846 A1* | 12/2015 | Kopko | ............... | F25B 40/04 |
| | | | | 62/115 |
| 2018/0004173 A1* | 1/2018 | Patel | ..................... | F24F 11/30 |

* cited by examiner

TABLE 1A - WITH CONSTANT ECWT

| ACTUAL LOAD % | TONS | LCHW TEMP °F | EVAP APP °F | COND APP °F | CW RANGE °F | ECW TEMP °F | LCW TEMP °F | BTU PER MIN | EVAP REF °F | COND REF °F | EVAP PRESS PSIA | COND PRESS PSIA | REF HEAD PSI |
|---|---|---|---|---|---|---|---|---|---|---|---|---|---|
| 100% | 400 | 45 | 3 | 3 | 10 | 85 | 95 | 80,000 | 42 | 98 | 6.07 | 20.04 | 13.97 |
| 90% | 360 | 45 | 3 | 3 | 9 | 85 | 94 | 72,000 | 42 | 97 | 6.07 | 19.66 | 13.60 |
| 80% | 320 | 45 | 3 | 3 | 8 | 85 | 93 | 64,000 | 42 | 96 | 6.07 | 19.30 | 13.23 |
| 70% | 280 | 45 | 3 | 3 | 7 | 85 | 92 | 56,000 | 42 | 95 | 6.07 | 18.93 | 12.87 |
| 60% | 240 | 45 | 3 | 3 | 6 | 85 | 91 | 48,000 | 42 | 94 | 6.07 | 18.57 | 12.51 |
| 50% | 200 | 45 | 3 | 3 | 5 | 85 | 90 | 40,000 | 42 | 93 | 6.07 | 18.22 | 12.15 |
| 40% | 160 | 45 | 3 | 3 | 4 | 85 | 89 | 32,000 | 42 | 92 | 6.07 | 17.87 | 11.81 |
| 30% | 120 | 45 | 3 | 3 | 3 | 85 | 88 | 24,000 | 42 | 91 | 6.07 | 17.53 | 11.46 |

TABLE 1B - WITH CONSTANT ECWT

| ENTHALPY | | REFRIGERANT LIQUID | | | | WATER 60°F | REFRIGERANT | | |
|---|---|---|---|---|---|---|---|---|---|
| EVAP VAPOR BTU/LB | COND LIQUID BTU/LB | DELTA BTU/LB | FLOW LB/MIN | DENSITY LB/FT^3 | FLOW FT^3/MIN | FLOW GPM | DENSITY LB/FT^3 | LIQUID @60°F DENSITY LB/FT^3 | SPECIFIC GRAVITY | FLOW COEF Cr |
| 96.17 | 32.65 | 63.52 | 1259.47 | 94.43 | 13.34 | 99.78 | 62.36 | 92.88 | 1.49 | 32.58 |
| 96.17 | 32.40 | 63.77 | 1129.11 | 94.43 | 11.96 | 89.45 | 62.36 | 92.88 | 1.49 | 29.61 |
| 96.17 | 32.15 | 64.01 | 999.78 | 94.43 | 10.59 | 79.21 | 62.36 | 92.88 | 1.49 | 26.58 |
| 96.17 | 31.90 | 64.26 | 871.45 | 94.43 | 9.23 | 69.04 | 62.36 | 92.88 | 1.49 | 23.49 |
| 96.17 | 31.66 | 64.51 | 744.09 | 94.43 | 7.88 | 58.95 | 62.36 | 92.88 | 1.49 | 20.34 |
| 96.17 | 31.41 | 64.76 | 617.71 | 94.43 | 6.54 | 48.94 | 62.36 | 92.88 | 1.49 | 17.13 |
| 96.17 | 31.16 | 65.00 | 492.30 | 94.43 | 5.21 | 39.00 | 62.36 | 92.88 | 1.49 | 13.85 |
| 96.17 | 30.92 | 65.25 | 367.83 | 94.43 | 3.90 | 29.14 | 62.36 | 92.88 | 1.49 | 10.50 |

FIG 6B

TABLE 1C - WITH CONSTANT ECWT

| COMPRESSED GAS | | | REFRIG BTU/LB | TOTAL REJECTED HEAT RATE | | | HR TO LOAD RATIO |
|---|---|---|---|---|---|---|---|
| SUPER-HEAT °F | TOTAL °F | VAPOR BTU/LB | | BTUH | TONS | % | |
| 20 | 118 | 107.09 | 74.44 | 5,625,580 | 468.8 | 100.00% | 1.172 |
| 20 | 117 | 106.95 | 74.55 | 5,050,648 | 420.9 | 89.78% | 1.169 |
| 20 | 116 | 106.81 | 74.66 | 4,478,560 | 373.2 | 79.61% | 1.166 |
| 20 | 115 | 106.67 | 74.77 | 3,909,272 | 325.8 | 69.49% | 1.163 |
| 20 | 114 | 106.52 | 74.86 | 3,342,305 | 278.5 | 59.41% | 1.161 |
| 20 | 113 | 106.38 | 74.97 | 2,778,596 | 231.5 | 49.39% | 1.158 |
| 20 | 112 | 106.24 | 75.08 | 2,217,595 | 184.8 | 39.42% | 1.155 |
| 20 | 111 | 106.10 | 75.18 | 1,659,265 | 138.3 | 29.50% | 1.152 |

FIG 6C

TABLE 2A - WITH VARYING ECWT

| ACTUAL LOAD % | TONS | LCHW TEMP °F | EVAP APP °F | COND APP °F | CW RANGE °F | ECW TEMP °F | LCW TEMP °F | BTU PER MIN | EVAP REF °F | COND REF °F | EVAP PRESS PSIA | COND PRESS PSIA | REF HEAD PSI |
|---|---|---|---|---|---|---|---|---|---|---|---|---|---|
| 100% | 400 | 45 | 3 | 3 | 10 | 85 | 95 | 80,000 | 42 | 98 | 6.066 | 20.039 | 13.973 |
| 90% | 360 | 45 | 3 | 3 | 9 | 77 | 86 | 72,000 | 42 | 89 | 6.066 | 16.860 | 10.794 |
| 80% | 320 | 45 | 3 | 3 | 8 | 69 | 77 | 64,000 | 42 | 80 | 6.066 | 14.090 | 8.024 |
| 70% | 280 | 45 | 3 | 3 | 7 | 61 | 68 | 56,000 | 42 | 71 | 6.066 | 11.690 | 5.624 |
| 60% | 240 | 45 | 3 | 3 | 6 | 56 | 62 | 48,000 | 42 | 65 | 6.066 | 10.278 | 4.212 |
| 50% | 200 | 45 | 3 | 3 | 5 | 51 | 56 | 40,000 | 42 | 59 | 6.066 | 9.005 | 2.940 |
| 40% | 160 | 45 | 3 | 3 | 4 | 51 | 55 | 32,000 | 42 | 58 | 6.066 | 8.806 | 2.740 |
| 30% | 120 | 45 | 3 | 3 | 3 | 51 | 54 | 24,000 | 42 | 57 | 6.066 | 8.610 | 2.544 |

FIG 7A

TABLE 2B - WITH VARYING ECWT

| ENTHALPY | | | REFRIGERANT LIQUID | | | WATER 60°F | REFRIGERANT LIQUID @60°F | | |
|---|---|---|---|---|---|---|---|---|---|
| EVAP VAPOR BTU/LB | COND LIQUID BTU/LB | DELTA BTU/LB | FLOW LB/MIN | DENSITY LB/FT^3 | FLOW FT^3/MIN | FLOW GPM | DENSITY LB/FT^3 | DENSITY LB/FT^3 | SPECIFIC GRAVITY | FLOW COEF Cr |
| 96.165 | 32.646 | 63.519 | 1259.47 | 94.426 | 13.338 | 99.78 | 62.36 | 92.88 | 1.49 | 32.58 |
| 96.165 | 30.425 | 65.740 | 1095.22 | 94.426 | 11.599 | 86.77 | 62.36 | 92.88 | 1.49 | 32.23 |
| 96.165 | 28.218 | 67.947 | 941.91 | 94.426 | 9.975 | 74.62 | 62.36 | 92.88 | 1.49 | 32.15 |
| 96.165 | 26.025 | 70.140 | 798.40 | 94.426 | 8.455 | 63.25 | 62.36 | 92.88 | 1.49 | 32.55 |
| 96.165 | 24.570 | 71.595 | 670.44 | 94.426 | 7.100 | 53.12 | 62.36 | 92.88 | 1.49 | 31.59 |
| 96.165 | 24.328 | 71.837 | 556.82 | 94.426 | 5.897 | 44.11 | 62.36 | 92.88 | 1.49 | 26.95 |
| 96.165 | 24.087 | 72.078 | 443.96 | 94.426 | 4.702 | 35.17 | 62.36 | 92.88 | 1.49 | 22.10 |
| 96.165 | 23.845 | 72.320 | 331.86 | 94.426 | 3.514 | 26.29 | 62.36 | 92.88 | 1.49 | 17.01 |

FIG 7B

TABLE 2C - WITH VARYING ECWT

| COMPRESSED GAS | | | TOTAL REJECTED HEAT | | | HR TO LOAD RATIO | R(CT) LOAD % | ERROR | | R(VT) LOAD % |
|---|---|---|---|---|---|---|---|---|---|---|
| SUPER-HEAT °F | TOTAL °F | VAPOR BTU/LB | REFRIG BTU/LB | BTUH | RATE TONS | % | | | DELTA % | F % | |
| 20 | 118 | 107.09 | 74.44 | 5,625,580 | 468.8 | 100.00% | 1.172 | 100.17% | -0.17% | 0% | 100.17% |
| 20 | 109 | 105.81 | 75.39 | 4,953,806 | 412.8 | 88.06% | 1.147 | 88.31% | 1.69% | 0.21% | 89.39% |
| 20 | 100 | 104.52 | 76.30 | 4,312,180 | 359.3 | 76.65% | 1.123 | 76.99% | 3.01% | 0.19% | 79.15% |
| 20 | 91 | 103.23 | 77.21 | 3,698,443 | 308.2 | 65.74% | 1.101 | 66.16% | 3.84% | 0.16% | 69.40% |
| 20 | 85 | 102.37 | 77.80 | 3,129,604 | 260.8 | 55.63% | 1.087 | 56.12% | 3.88% | 0.13% | 60.03% |
| 20 | 84 | 102.22 | 77.89 | 2,602,291 | 216.9 | 46.26% | 1.084 | 46.82% | 3.18% | 0.11% | 50.73% |
| 20 | 83 | 102.08 | 77.99 | 2,077,563 | 173.1 | 36.93% | 1.082 | 37.55% | 2.45% | 0.08% | 41.47% |
| 20 | 82 | 101.93 | 78.09 | 1,554,790 | 129.6 | 27.64% | 1.080 | 28.33% | 1.67% | 0.06% | 32.24% |
| | | | | | | | Average Factor (AveF) | | | 0.13% | |

FIG 7C

EFFICIENCY DATA FOR CHILLER 1

| ACTUAL LOAD % | TONS | ECWT 85°F kW/Ton | ECWT 70°F kW/Ton | ECWT 60°F kW/Ton |
|---|---|---|---|---|
| 100% | 400 | 0.520 | 0.383 | 0.310 |
| 90% | 360 | 0.515 | 0.370 | 0.293 |
| 80% | 320 | 0.521 | 0.363 | 0.279 |
| 70% | 280 | 0.529 | 0.362 | 0.267 |
| 60% | 240 | 0.539 | 0.367 | 0.261 |
| 50% | 200 | 0.560 | 0.373 | 0.260 |
| 40% | 160 | 0.600 | 0.392 | 0.267 |
| 30% | 120 | 0.656 | 0.433 | 0.300 |

Columns labeled: 800, 801, 802, 803, 804

METHOD TO DETERMINE PERFORMANCE OF A CHILLER AND CHILLER PLANT

CROSS REFERENCE TO RELATED APPLICATIONS

This application claims the benefit of PPA Ser. No. 62/291,887, filed Feb. 5, 2016 by the present inventor which is incorporated by reference.

This application uses the heat rejected by the chiller as disclosed in my U.S. Pat. No. 6,718,779 granted Apr. 13, 2004 which is incorporated by reference.

BACKGROUND

Prior Art

The following is a tabulation of some prior art that appears to be relevant:

U.S. Patents

| Pat. No. | Kind Code | Issue Date | Patentee |
|---|---|---|---|
| 8,615,371 | B2 | 2013 Dec. 24 | Hegar |
| 8,424,322 | B2 | 2013 Apr. 23 | Seki |
| 8,393,169 | B2 | 2013 Mar. 12 | Pham |
| 8,322,155 | B2 | 2012 Dec. 4 | Tutunoglu |
| 8,316,658 | B2 | 2012 Nov. 27 | Singh |
| 7,945,423 | B2 | 2011 May 17 | Seigel |
| 6,718,779 | B1 | 2004 Apr. 13 | Henry |
| 5,083,438 | A | 1992 Jan. 28 | McMullin |
| 4,768,346 | A | 1988 Sep. 6 | Mathur |
| 4,507,930 | A | 1985 Apr. 2 | Kaya |
| 4,325,223 | A | 1982 Apr. 20 | Cantley |

U.S. Patent Application Publications

| Publication Nr. | Kind Code | Publ. Date | Applicant |
|---|---|---|---|
| 20130031920 | A1 | 2013 Feb. 7 | Tegano |
| 20110023503 | A1 | 2011 Feb. 3 | Wang |
| 20090094998 | A1 | 2009 Apr. 16 | McSweeney |
| 20050223720 | A1 | 2005 Oct. 13 | Miller |

Non Patent Literature Document

ASHRAE Guideline 22-2012—Instrumentation for Monitoring Central Chilled Water Plant

TECHNICAL FIELD

The present invention relates to Refrigeration Systems and more particularly to Chiller and Chiller Plant Operations

Description of Prior Art

A chiller plant provides chilled water at a given temperature and or rate by way of a pump that then distributes the chilled water to various use points before it is returned to the chiller plant at a higher temperature. The refrigeration machine that produces the chilled water is typically known as a chiller. The chiller plant includes the chiller, a condenser water pump and a cooling tower or multiple units of each as described below.

While this chilled water may be any suitable cooling fluid it is normal to refer to it as chilled water (CHW). The CHW that leaves the chiller is referred to as leaving chilled water (LCHW) and the CHW that is returned to the chiller is referred to as entering chilled water (ECHW)

The refrigeration process of cooling the CHW creates heat that is rejected into a separate cooling fluid. While this separate cooling fluid may be any suitable fluid it is typically water and typically referred to as condenser water (CW). Heat is removed from the CW by a cooling tower before it is returned to the chiller. The CW leaving the chiller is referred to as leaving condenser water (LCW) and the water returning to the chiller is referred to as entering condenser water (ECW).

Performance evaluation of a chiller and chiller plant is accomplished in a haphazard manner in many of today's plant operations. As noted in ASHRAE Guideline 22-2012 "Chilled-water plants are rarely instrumented to provide an efficiency measurement". Many of today's modern designs for chiller plants do not include the instrumentation and data collection systems required for adequate efficiency measurements due to the complexity of the tabulated data and high cost of instrumentation. This information is not likely to be consulted on a regular basis. For these reasons the instrumentation and data collection systems are not justified and not included in the plant's design.

For those infrequent designs where the chiller plant is instrumented for performance evaluation the typical method is to monitor and record the work output by the chiller and compare it to the work input to the chiller and supporting equipment. Work output here is normally defined as tons of refrigeration produced by the chiller(s) and work input is defined as power input to the chiller and its support equipment in kilo Watt-hours. This data is then reduced to a single number or fraction and is expressed as kilo-Watts per ton (kW/ton).

There are significant difficulties with this single measure (kW/ton) since it will vary in either direction due to normal day to day operating conditions. Consequently the measure is difficult to compare to a benchmark. Benchmark being defined as a point of reference against which the measure can be assessed.

There are attempts to overcome this problem with the kW/ton measure by collecting or monitoring various operating parameters and tabulating or charting them against a common period of time, thus providing data sets that require considerable time to prepare study and communicate. Typically a plethora of sensors is deployed throughout the chiller plant and a number of data sets are collected with each measurement being time stamped. Additional data such as published weather reports may also be required and correlated by date and time to the collected data.

FIG. 1 (Prior Art) describes a common chiller plant with typical instrumentation for performance evaluation. Chiller 1 includes a refrigerant compressor 2 a refrigerant evaporator 3 a refrigerant condenser 4 a chiller control panel 5 and an electric motor and drive 12. ECHW 6 enters evaporator 3 where it is cooled. Then LCHW 7 leaves evaporator 3 and is distributed to the use points (cooling heat exchangers) before returning to the chiller.

For the purposes of this analysis the method of distribution of CHW is not included as it can be evaluated differentially from the production of CHW and is a separate issue not a part of this evaluation.

Heat is rejected by condenser 4 to LCW 11 which circulates to a cooling tower 14. A fan 16 powered by an electric motor and drive 12 forces air over the LCW 11 causing it to cool. CW 15 is collected in the basin of cooling tower 14. ECW 10 is drawn from the basin and boosted by condenser water pump 13 before it enters condenser 4 to complete the cycle. CW pump 13 is powered by an electric motor and drive 12.

The work input by the chiller compressor 2 increases the pressure of the refrigerant gas. This compressed gas then passes to condenser 4, a heat exchanger that cools the refrigerant gas until it liquefies. This process liberates heat that is taken away by LCW 11. The liquefied refrigerant then flows to evaporator 3 which is also a heat exchanger. The liquid refrigerant is allowed to expand and cool further as it evaporates to a gaseous state at a lower pressure. The evaporating refrigerant draws heat from ECHW 6 thus decreasing its temperature before it leaves as LCHW 7. The work output of the chiller is the amount of refrigeration that takes place and is determined by the quantity of CHW and the temperature change in the CHW as it passes through evaporator 3.

Temperature sensor 9 measures the temperature of LCHW 7 where the monitored data point is defined as leaving chilled water temperature (LCHWT). Another temperature sensor 9 measures the temperature of ECHW 6 where the monitored data point is defined as the entering chilled water temperature (ECHWT). A flow meter 8 is mounted in the CHW line to measure a flow rate (CHWFR). Power meter 18 measures the power used by electric motor and drive 12 for chiller 1. Another power meter 18 measures the power used by electric motor and drive 12 for CW pump 13 and another power meter 18 measures the power used by electric motor and drive 12 for fan 16.

Energy meter 17 collects the LCHWT, and the ECHWT, and the CHWFR to calculate the refrigeration rate. Data management system 19 receives the input from the energy meter 17 plus inputs from the power meters 18 and calculates performance parameters such as kW/ton and tabulates the data for further use and display.

ASHRAE Guideline 22-2012 Titled "Instrumentation for Monitoring Central Chilled-Water Plant Efficiency" originally published in 2008 and updated in 2012 defines a method to determine the efficiency of a chiller and chiller plant as kW/ton. This guideline recommends calculating three values that are defined as; 1) "ChWPlant Thermal Cooling Output" 2) "chilled-water plant Efficiency" and 3) "Plant Heat of Rejection".

While "Plant Heat of Rejection" is listed as a data point to be collected it is not referenced in the body of the guideline as any part of the solution to determine performance. Performance calculations are provided in great detail to insure that the chilled water parameters of mass, heat content, temperature and flow rate are accurately computed for chilled water leaving and entering the chiller.

ASHRAE Guideline 22-2012 also recommends instrumentation to monitor selected parameters to include power measurements of all; chillers, cooling towers, condenser water pumps, and chilled water pumps. Instrumentation is also recommended to monitor flow measurements of plant chilled water and plant condenser water. More instrumentation is deemed necessary to monitor the temperatures of; chilled water supply and chilled water return, condenser water supply and condenser water return for all installed chillers. Even more instrumentation is advised to monitor ambient outside air dry bulb and ambient outside air wet bulb temperatures. This recommended data collection is even more extensive than the nominal instrumentation shown in FIG. 1 (Prior Art).

ASHRAE Guideline 22-2012 continues to recommend that all the values of all the monitored parameters be recorded with a data logger and collated into a data base that can be queried for future analysis. Further recommendations include all of the data be organized into a spreadsheet. The intent is for the data to be trended and compared over time and including presenting it in graphical form for analysis by the plant operators.

Therefore ASHRAE Guideline 22-2012 recognizes the short coming of just monitoring and trending the single plant efficiency and adds considerable complexity to the evaluation process. This results in a time consuming process that requires skill to interpret and communicate to others.

Methods that require obtaining accurate flow measurement of the chilled water are dependent on piping configuration parameters. In many facilities piping configurations do not have adequate pipe runs to for accurate measurements with the existing CHW piping system.

Other methods including U.S. Pat. No. 5,083,438 to McMullin, et al. (1992) require a plethora of sensors some even embedded in the chiller to collect performance criteria. Results are also focused solely on the compressor and its separate components. And there is no effort to evaluate the complete chiller plant.

FIG. 2 (Prior Art) shows a chiller plant with a computerized plant controller 200 that monitors the heat rejected from chiller 1 and includes a means to control the speed of fan 16 and a means to control the speed of pump 13. The computerized plant controller 200 is further described in my previous U.S. Pat. No. 6,718,799 (2004) 'Method to Optimize Chiller Plant Operation'.

Temperature sensor 9 measures the temperature of the LCW 11 providing a leaving condenser water temperature (LCWT). Another temperature sensor 9 measures the temperature of the ECW 10 providing an entering condenser water temperature (ECWT). A flow meter 8 is mounted in a CW line to measure condenser water flow rate (CWFR).

Computerized plant controller 200 collects the information such as a LCWT, an ECWT and a CWFR to evaluate the heat rejected by chiller 1 and control the speed of fan 16 and/or the speed of CW pump 13.

While this method teaches an important concept that shows how measuring the heat rejected by the chiller is used as a control function for variable condenser water temperature, it also fails to provide real time performance results.

The control function is derived from an approximate curve for chiller 1 and similar chillers using empirical or published data sets for a typical chiller(s) of similar size as manufactured by most suppliers and is necessarily conservative for use across a range of chillers. Therefore this function cannot be independently customized for a given chiller.

SUMMARY

In accordance with one embodiment a method to determine the performance of a chiller uses the heat rejected by the chiller.

Advantages

Therefore several advantages are achieved to provide performance evaluation with fewer points of instrumentation and at lower cost that also allows for real time comparisons with variable operating conditions using modeled results versus actual results.

DRAWINGS—FIGURES

The drawings described here are for illustration purposes and are not intended to limit the scope of the present disclosure in any way.

FIG. 1 shows prior art of a chiller plant that includes typical instrumentation and an energy management system.

FIG. 2 shows prior art of a chiller plant with a computerized plant controller as described by my previous U.S. Pat. No. 6,718,779

FIGS. 6A, 6B and 6C shows a set of linked spread sheet tables with various operating parameters for chiller 1 with varying load conditions and a constant entering condenser water temperature.

FIGS. 7A, 7B and 7C shows a set of linked spread sheet tables with various operating parameters for chiller 1 with varying load conditions and varying entering condenser water temperature.

DRAWINGS—REFERENCE NUMERALS

Figure 1:
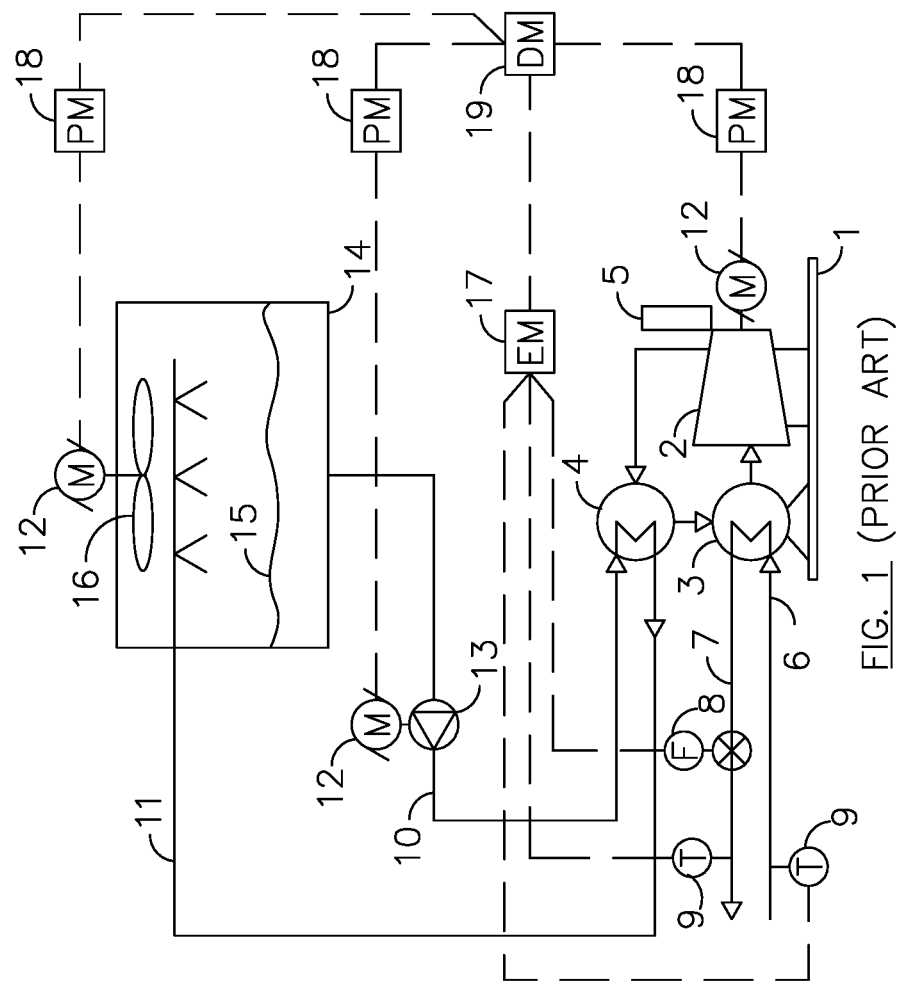
Figure 2:
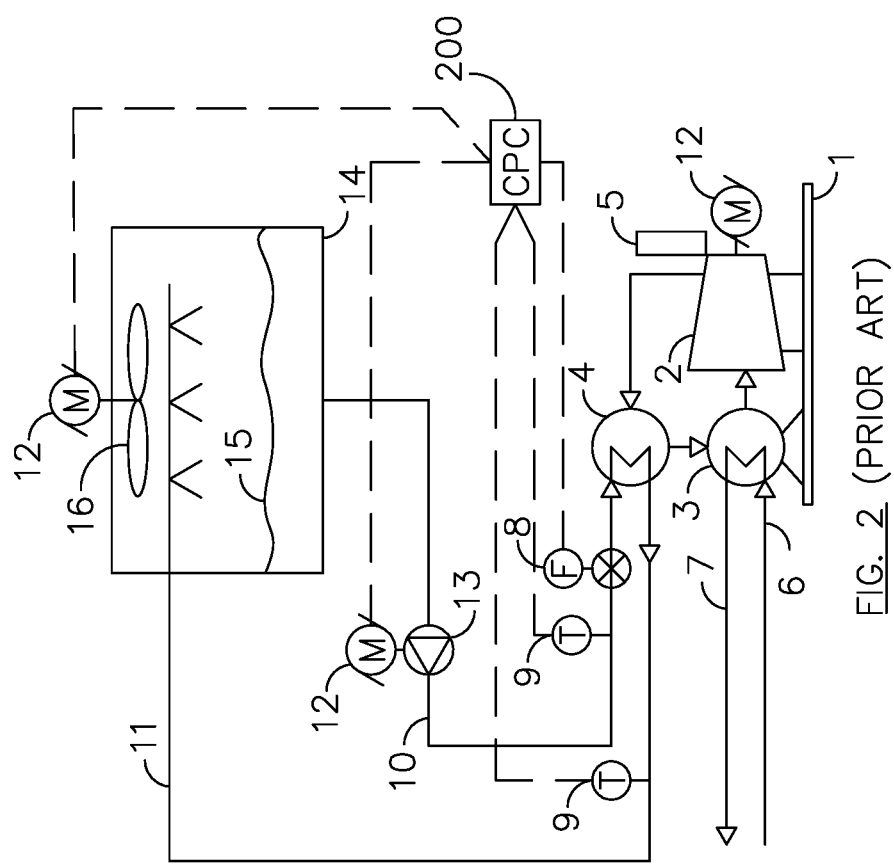
Figure 3A:
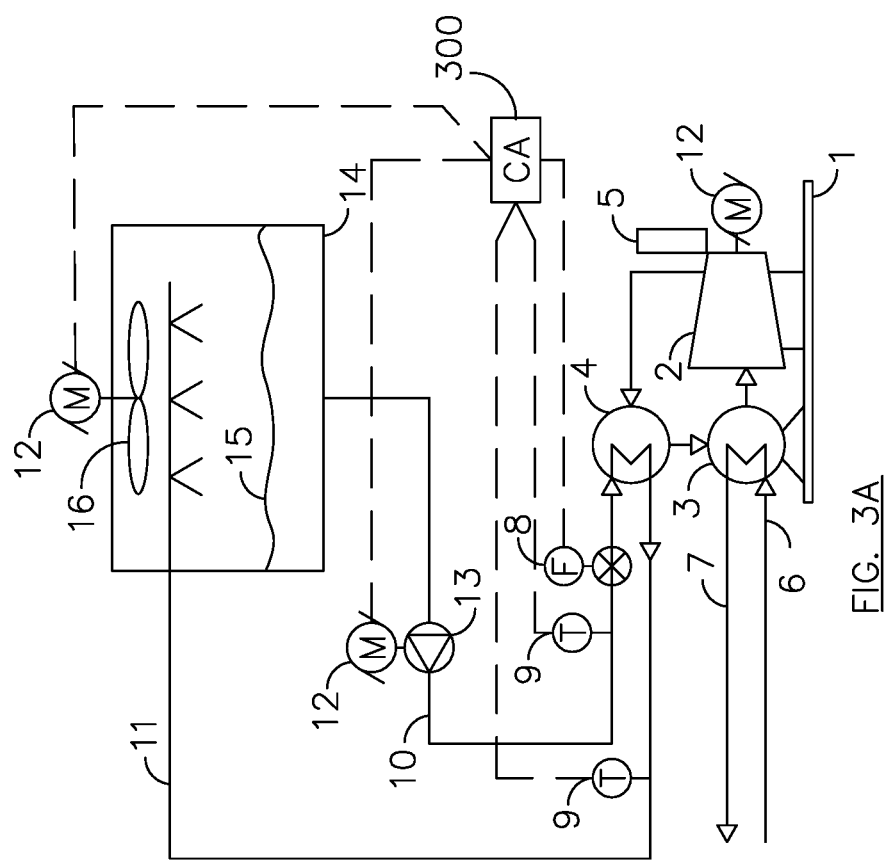
FIG. 3A shows a chiller plant diagram with instrumentation, data collection and the computerized analyzer as defined by one or more embodiments herein.

No Description
1 chiller
2 chiller refrigerant compressor
3 chiller refrigerant evaporator
4 chiller refrigerant condenser
5 chiller control panel
6 ECHW (chilled water entering chiller)
7 LCHW (chilled water leaving chiller)
8 flow meter
9 temperature sensor
10 ECW (condenser water entering chiller)
11 LCW (condenser water leaving chiller)
12 electric motor drive
13 condenser water pump
14 cooling tower
15 condenser water
16 cooling tower fan
17 energy meter
18 power meter
19 data management computer
200 computerized plant controller
300 computerized analyzer
301 building automation and control system
500 flow restrictor
501 CW tubes
502 hot refrigerant liquid
503 cold refrigerant liquid
504 CHW tubes
610 refrigeration load as a percent of maximum design load
611 refrigeration load in tons
612 leaving chilled water temperature
613 evaporator approach temperature
614 condenser approach temperature
615 condenser water temperature range
616 entering condenser water temperature
617 leaving condenser water temperature
618 refrigeration load as BTU per minute
619 evaporator refrigerant temperature
620 condenser refrigerant temperature
621 evaporator pressure
622 condenser pressure
623 refrigerant head pressure
630 evaporator refrigerant vapor enthalpy
631 condenser refrigerant liquid enthalpy
632 enthalpy difference
633 refrigerant liquid flow rate-lbs/min
634 refrigerant liquid density
635 refrigerant liquid flow rate-cubic feet/minute
636 refrigerant liquid flow rate-gallons/minute
637 water density
638 refrigerant liquid density
639 refrigerant liquid specific gravity
640 refrigerant flow coefficient
650 compressed gas superheat
651 compressed gas total temperature
652 compressed gas vapor enthalpy
653 total rejected heat refrigerant enthalpy
654 total rejected heat rate-BTUH
655 total rejected heat rate-tons
656 total rejected heat-%
657 ratio of rejected heat to refrigeration load
700 refrigeration load for constant ECW temperature-%
701 error delta-%
702 error F-%
703 refrigeration load for variable ECW temperature-%
800 actual load-%
801 actual load—tons
802 efficiency at 85° F. ECWT
803 efficiency at 70° F. ECWT
804 efficiency at 60° F. ECWT
900 curve at 85° F. ECWT
901 curve at 70° F. ECWT
902 curve at 60° F. ECWT DETAILED DESCRIPTION—FIGS. 3A, 5, 6A, 6B, 6C, 7A, 7B, 7C, 8 AND 9—FIRST EMBODIMENT FIG. 3A illustrates a typical chiller plant with one chiller 1, one cooling tower 14, and one condenser water (CW) pump 13. These three units are connected by a piping circuit through which CW flows. The CW takes heat that is rejected by the chiller to the cooling tower where it is cooled and pumped back to the chiller refrigerant condenser 4.

Information required to determine chiller and chiller plant performance is readily collected with the instrumentation shown herein. A first temperature sensor 9 is installed in the entering condenser water (ECW) piping and a second temperature sensor 9 is installed in the leaving condenser water (LCW) piping 11. A flow meter 8 is installed to measure the flow rate of CW.

This real time data is read and collected from the instrumentation by computerized analyzer 300. In this embodiment the computerized analyzer 300 comprises a programmable logic computer (PLC) and a display panel compatible with said PLC. The PLC is a common industrial controller that can be readily programmed by technicians to accept common industrial analog and digital inputs. The PLC is programmed to make specific calculations based on the gathered data and programmed presets. Thus computerized analyzer 300 constitutes a first means for determining quantity of heat rejected by chiller 1 and a second means for calculating refrigeration load of chiller 1.

Additional real time information read by computerized plant analyzer 300 is obtained from electric motor drives 12 for condenser water pump 13 and cooling tower fan 16. Electric motor drives 12 are the type that provide real time power demand data either as a simple analog signal or as voltage and amperage signals that can be used to determine power demand.

Figure 5:
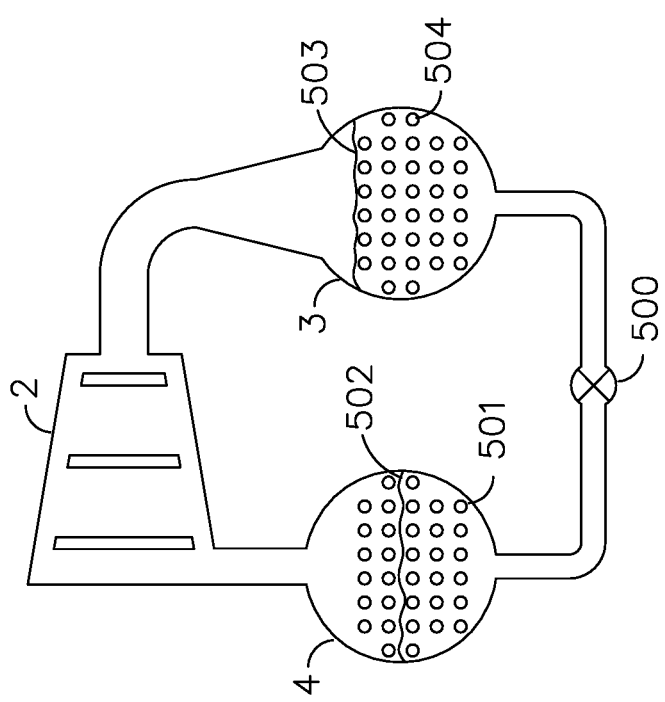
FIG. 5 shows a diagram of chiller 1 referenced in previous figures and illustrates the refrigerant flow path including the flow restriction between condenser and evaporator.

FIG. 5 shows a diagram of chiller 1 with condenser 4 compressor 2 evaporator 3 and flow restrictor 500. Condenser 4 is full with hot liquid refrigerant 502 that is cooled by CW circulating through the CW tubes 501 located in condenser 4. The liquid refrigerant flows around the CW tubes 501 and out into the pipe at the bottom of condenser 4. Liquid refrigerant flows down and through the pipe and flow restrictor 500 before entering evaporator 3. Cold liquid refrigerant fills evaporator 3 and surrounds chilled water (CHW) tubes 504 located therein. A low pressure in the evaporator created by the compressor causes the cold liquid refrigerant 503 to evaporate (or boil off). CHW is circulated through the CHW tubes 504 where it is chilled. Refrigerant vapor that boils off enters compressor 2 where it is compressed to a higher pressure and temperature, then expelled into condenser 4 where it is condensed to hot liquid refrigerant 502 thus completing the cycle.

The flow rate of liquid refrigerant is a function of the pressure difference between condenser 4 and evaporator 3 and the restriction to flow between these two vessels. This restriction to flow is represented by flow restrictor 500.

Flow restrictor 500 is characterized by the coefficient of restriction (Cr) for chiller 1. Flow rate (Q) can be determined by Equation A;

$$Q = Cr(\sqrt{(\Delta P/S)})$$   Equation A where Q=flow rate in gallons per minute, ΔP=pressure difference across the restriction, S=specific gravity.

Cr is a fixed characteristic that describes the physical restriction that has fixed dimensions such as a full open valve or an orifice with the opening completely covered by liquid and similar piping arrangements. Refrigerant pressure is a thermophysical property of a refrigerant that is determined by its liquid temperature. Refrigerant temperatures are a function of the heat exchange process in condenser 4 and evaporator 3 and can be calculated as shown below using known chiller design parameters. Cr for chiller 1 is calculated at maximum design load using the manufacturer's specifications. Once Cr is known the flow rate Q can be calculated for any ΔP.

The flow of liquid refrigerant between condenser 4 and evaporator 3 through the restrictor 500 is part of a two phase flow of liquid refrigerant and gaseous refrigerant. In many chillers the refrigerant also contains a small quantity of refrigerant lubricant and there may be other contaminants as well.

Flow restrictor 500 represents any form of restriction that is designed into a chiller. As examples of the restriction, one chiller design may use a valve or valves to control refrigerant flow between the condenser 4 and evaporator 3, another design may use a fixed orifice plate or a series of orifice plates, another design may include an economizer that removes some of the gaseous refrigerant that is returned directly to the compressor.

FIGS. 6A, 6B and 6C are a set of three linked spreadsheet tables that calculates dependent relationships of properties for chiller 1 operating with a defined refrigerant and a constant entering design condenser water temperature. The refrigerant in chiller 1 is R-123.

Each column (COL) identifies a chiller operating parameter, a refrigerant property, or calculated value dependent on one or more of the defined chiller parameters or refrigerant property value. Selected refrigerant properties can be determined using ASHRAE data sets or NIST (National Institute of Standards and Technology) REFROP software or any suitable source. The top row is fully derived from the design criteria for chiller 1 at maximum design load. Each subsequent row is a partial load condition defined as a percent of maximum design load.

FIG. 6A first column, Col 610 is refrigeration load as a percent of maximum design load. Refrigeration load in tons Col 611 directly correlates to the load percentage of Col 610.

Design values for leaving chilled water temperature Col 612, evaporator approach temperature Col 613, and condenser approach temperature Col 614 are tabulated here.

Condenser water temperature range Col 615 is a direct function of load and condenser water flow rate. The most common condition occurs when the condenser water flow is held constant and the temperature range vary directly with the percent load. A second less common condition occurs with variable condenser water flow and the range stays constant for all loads. In this example constant condenser water flow is represented.

Entering condenser water temperature Col 616 is a design parameter at maximum design load and is held constant for each row in this set of linked spread sheets (FIGS. 6A, 6B and 6C). Leaving condenser water temperature Col 617 is directly calculated by subtracting Col 615 from Col 616.

Refrigeration load as BTU per minute Col 618 is a direct conversion of the value in Col 611 from tons to BTU per minute.

Evaporator refrigerant temperature Col 619 is calculated by subtracting Col 613 from Col 612. Condenser refrigerant temperature Col 620 is calculated by adding Col 614 to Col 617.

Evaporator pressure Col 621 is a property of the liquid refrigerant in chiller refrigerant evaporator 3 and is determined by the evaporator refrigerant temperature Col 619. Refrigerant properties can be determined using software available from the National Institute of Standards and Technology (NIST) or refrigerant tables in the ASHRAE Handbook of Fundamentals and interpolated from the 5° F. bin temperatures listed therein or any suitable source.

Condenser pressure Col 622 is also a property of the liquid refrigerant in chiller refrigerant condenser 4 and is determined by the condenser refrigerant temperature Col 620. Refrigerant head pressure Col 623 is a direct calculation obtained by subtracting Col 621 from Col 622.

FIG. 6B as previously stated continues this linked table set with evaporator refrigerant vapor enthalpy Col 630 and condenser refrigerant liquid enthalpy Col 631 properties that are based on the evaporator refrigerant temperature Col 619. Enthalpy difference Col 632 is obtained by subtracting Col 631 from Col 630.

Refrigerant liquid flow rate-lbs/min Col 633 is calculated by dividing Col 632 by Col 618. Refrigerant liquid density Col 634 is a refrigerant property based on evaporator refrigerant temperature Col 619. Refrigerant liquid flow rate-cubic feet/minute Col 635 is a conversion obtained by dividing Col 633 by Col 634. Refrigerant liquid flow rate-gallons/minute Col 636 is a conversion obtained by multiplying Col 635 by 7.481 to convert cubic feet to gallons.

Water density Col 637 at a normalized temperature of 60° F. is tabulated here. The property, refrigerant liquid density Col 638 at a normalized temperature of 60° F. is tabulated in this column. Refrigerant flow coefficient Col 640 is a dimensionless value and is calculated using a form of Equation A for all loads. Col 640 is used in this table set as information only.

FIG. 6C as completes this linked table set starting with compressed gas superheat Col 650. Col 650 is an estimate of operational losses including the observable superheat temperature at the final outlet of compressor 2. At maximum design load the value in Col 650, top row, is manipulated until the calculated value of total heat rejected Col 654 matches the design specification for chiller 1 at maximum design load. This example uses the one value for all rows of Col 650 but does not preclude further adjustments of the value with load and or manufacturers supplied data for chiller 1.

Compressed gas total temperature Col 651 is calculated by adding the value in Col 650 to the value in Col 620. Compressed gas vapor enthalpy Col 652 is a refrigerant property determined by the temperature in Col 651.

Total rejected heat refrigerant enthalpy Col 653 is determined by subtracting Col 632 from Col 652. Total rejected heat rate—BTUH Col 654 is determined by multiplying Col 652 by Col 633×60 min/hr. Total rejected heat rate—tons Col 655 is determined by dividing Col 633 by 12,000 BTU/ton. Total rejected heat % Col 656 is calculated as percent of the maximum rejected heat by dividing the value in the respective row Col 654 by the top row Col 654. And ratio of rejected heat to refrigeration load Col 657 is determined by dividing Col 655 by Col 611.

A correlation equation of actual refrigeration load to heat rejection can be determined for chiller 1 with the completed data tables FIGS. 6A, 6B and 6C using, either the values in Col 610 and Col 656 as a data set, or the values in Col 611 and Col 655.

Plot the values on an XY scatter chart where the numerical values on the Y or vertical axis represents the actual load and the values on the X or horizontal axis represents the rejected heat. Therefore the actual load is the dependent axis and the rejected heat is the independent axis. Running a regression analysis using suitable and readily available software the following equation is determined where the actual load (Rol is calculated as follows;

$$R_{CT}=AX+B \qquad \text{Equation B}$$

where $R_{CT}$=actual refrigeration load and X=rejected heat quantity modified by constants A and B. Using the data in Col 610 and Col 656 the results are expressed as a percent of maximum design quantities. The subscript CT representing constant temperature describes a constant ECWT for all loads. Therefore a customized algorithm can be applied to determine the refrigeration load from the condenser's entering and leaving water temperatures and flow rate when the entering condenser water is maintained at a known constant value.

Thus computerized plant analyzer 300 constitutes a fifth means to calculate refrigeration load as a function of rejected heat for chiller 1 with a constant entering condenser water temperature.

FIGS. 7A, 7B and 7C are a set of three linked spreadsheet tables that calculates dependent relationships of properties for chiller 1 operating with variable entering condenser water temperatures and a defined refrigerant. The refrigerant in chiller 1 is R-123.

FIGS. 7A, 7B and 7C duplicates the columns in FIGS. 6A, 6B and 6C and includes four (4) additional columns in FIG. 7C. The part load percentages are the same and must match. This is a special case where the entering condenser water temperature Col 616 (FIG. 7A) is varied beginning with the design CW temperature at maximum design load and reducing the temperature as the load is reduced.

The design entering CW temperature is entered into the top row Col 616 (FIG. 7A). For each subsequent row the ECWT is adjusted until flow coefficient (Cr) Col 640 (FIG. 7B) approaches but is less than be maximum Cr in the top row Col 640 (FIG. 7B).

There is a lower limit for the CW temperature Col 616 (FIG. 7A) which is determined by the minimum specified head pressure for chiller 1 as defined by the manufacturer in their specifications. Refrigerant head pressure Col 623 (FIG. 7A) will vary as the CW temperature changes. Therefore the minimum CW temperature must be high enough to insure that the refrigerant head pressure Col 623 (FIG. 7A) remains higher than minimum head pressure specified for chiller 1.

Refrigeration load ($R_{CT}$) for constant ECW temperature-% Col 700 is calculated using Equation B. The constants A and B are determined from the data developed by FIGS. 6A, 6B, 6C and running a regression analysis as previously explained so that A=0.9928, and constant B=0.0089. Total rejected heat-% Col 656 (FIG. 7C) is used as the value X in Equation B.

Error delta-% Col 701 is calculate as the difference between Col 700 and Col 610 (FIG. 7A). Error F-% Col 702 is an error factor which is a function of the difference between design temperature and operating temperature. Col 702 is therefore calculated for the second and each subsequent row by dividing Col 701 by the temperature difference (DT) where DT is determined by subtracting the temperature in the corresponding row Col 616 from the maximum design temperature in the top row Col 616.

Col 702, second row through the bottom row is summed and averaged which is displayed below the column. This Average Factor (AveF) is used to modify Equation B. The AveF is multiplied by DT and added to Equation B giving us the following equation to calculate the actual load where the CW temperature varies ($R_{VT}$).

$$R_{VT}=AX+B+AveF \times DT \qquad \text{Equation C}$$

$R_{VT}$=actual refrigeration load and X=rejected heat quantity modified by constants A and B and Ave(F) multiplied by the temperature difference. The subscript VT categorizes the result with an ECWT that varies from the fixed design ECWT. Therefore a customized algorithm can be applied to determine the refrigeration load from the condenser's entering and leaving water temperatures and flow rate when the entering condenser water is variable. Refrigeration load ($R_{VT}$) for variable ECW temperature-% Col 703 is calculated using Equation C.

Figures 8, 9:
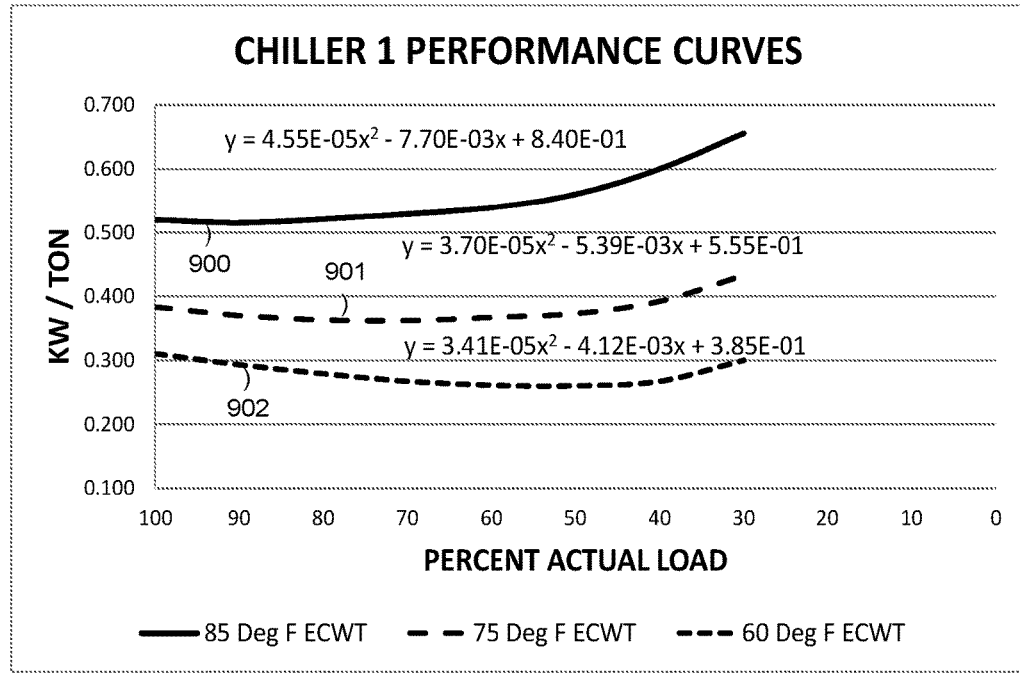
FIG. 8 shows a data table for chiller 1 that describes the efficiency of the chiller under different operating loads and entering condenser water temperatures.
FIG. 9 shows a set of performance curves for chiller 1.

FIG. 8 provides efficiency data for chiller 1 as defined by the manufacturer. The data is tabulated for different CW temperatures and loads as shown. Actual load-% Col 800 shows the load as percent of maximum load. Actual load—tons Col 801 states the load in tons of refrigeration. Efficiency at 85° F. ECWT Col 802 tabulates the efficiency as kW/Ton at each given percent load, similarly efficiency at 70° F. ECWT Col 803 and efficiency at 60° F. ECWT Col 804 provides efficiency as kW/Ton for the listed loads.

FIG. 9 is a plot of the information tabulated in FIG. 8. Each curve represents a constant ECWT. The Y axis denotes chiller efficiency as kW per Ton and the X axis denotes refrigeration load as a percent of maximum load. ECWT at 85° F. Curve 900 is the maximum design temperature. ECWT at 75° F. Curve 901 and ECWT at 60° F. Curve 902 round out the three curves. Also, note that Chiller 1 has a variable speed drive.

A regression analysis is performed for each plot and the result is a continuous curve for each plot including an equation that matches each curve. A visual inspection of the relationship of the three curves demonstrates that they are nearly parallel. By interpolating between the curves a single calculation can be developed to obtain the efficiency at any ECWT and any load. Curve 900 corresponds to Equation D:

$$Y_{85}=0.000455X^2-0.0077X+0.84 \quad \text{Equation D}$$

Curve 902 corresponds to Equation E:

$$Y_{60}=0.000341X^2-0.00412X+0.385 \quad \text{Equation E}$$

For a given load, efficiency at any temperature between 85° F. and 60° F. can be obtained by interpolating between Equation D and Equation E. This produces the following Equation F:

$$E_{ECWT} = Y_{85} - (Y_{85} - Y_{60})\frac{1}{25}(DT) \quad \text{Equation F}$$

DT was previously defined as the temperature difference between the maximum design ECWT and the actual or operating ECWT.

The actual power demand at the previously determined operating load and ECWT for chiller 1 is calculated by multiplying the load X (%) times the efficiency $E_{ECWT}$ as determined above and gives the following Equation G.

$$P=XE_{ECWT} \quad \text{Equation G}$$

Thus Equations D, E, F, and G applied by the computerized analyzer 300 constitutes a means to determine the power demand for chiller 1.

OPERATION—FIGS. 3A, 5, 6A, 6B, 6C, 7A, 7B, 7C, 8, AND 9—FIRST EMBODIMENT

The refrigeration process makes chilled water (CHW) by removing heat and transferring it to another medium. The water cooled chiller 1 transfers this heat to secondary water source known as condenser water (CW). Thus the refrigeration load or cooling capacity of the CHW is a function of the heat removed from the CHW and transferred to the CW.

The heat removed from the CHW and transferred to the CW is a significant portion of the total heat that is rejected by the refrigeration process. Additional heat is transferred to the CW as a result of the work required to drive the refrigeration process, and is a function of the amount of refrigeration that is produced.

Therefore this embodiment monitors and evaluates the rejected heat to determine performance of the refrigeration process and apply it to the chiller plant as a whole.

The amount of total heat rejected by chiller 1 and transferred to the CW is determined by the temperature difference and flow rate of the CW. Temperature sensors 9 are used to monitor the ECW and LCW and the flow rate is either measured with flow meter 8 or determined by system design.

The computerized plant analyzer 300 is programmed with equipment parameters and innovative calculation methods. It monitors and records active data inputs described above. It performs the required calculations and displays results.

The computerized analyzer 300 also models chiller 1 operation. Selected design parameters provided by the manufacturer, along with typical engineering calculations for standard properties plus new calculation methods are combined to predict and determine selected performance metrics.

Determining refrigeration load as a function of rejected heat involves an approach that incorporates the work of the refrigeration process and inefficiencies that are also transferred as heat into the CW. This embodiment achieves this approach with a unique method to calculate the flow of refrigerant through chiller 1.

FIG. 5 shows a diagram of the chiller 1 process with refrigerant. The liquid refrigerant flows from the condenser 4 through the restrictor 500 and into the evaporator 3 where it becomes a gas and then flows into the compressor 2 and back into the condenser 3 where it reverts to a liquid.

Restrictor 500 can be characterized based on the rated full load operation of chiller 1 and making certain assumptions that are consistent with the accuracy requirements of this embodiment. This characterization is defined as the coefficient of restriction (Cr).

Cr is determined for chiller 1 using Equation A as previously defined and reordered so that;

$$Cr=Q/(\sqrt{(\Delta P/S)}) \quad \text{Equation A}$$

Using a flow coefficient through a restriction such as a valve is a common engineering principle for liquid flow as discussed in many reference materials one of those being "Flow of Fluids, Crane Technical Paper 410" and specifically equation 2-10. "The flow coefficient is defined as the amount of water flow at 60° F., in gallons per minute, at a pressure drop of one pound per square inch across a component. It can be applied to fluids other than water using specific gravity and calculated with Equation 2-10".

FIGS. 6A, 6B, 6C calculates Cr for each flow regime (load and ECWT) therefore Cr varies as restrictor 500 is allowed to close. For this operational condition where the ECWT is maintained at its fully rated design value an equation is developed that determines the refrigeration load $R_{CT}$ as a function of the rejected heat.

$$R_{CT}=AX+B \quad \text{Equation B}$$

FIGS. 7A, 7B, 7C is a special case where ECWT floats down to its specified minimum as the load is reduced. The value of Cr is held constant at the value determined for maximum refrigeration load until the ECWT minimum is reached. The operation is such that that orifice or valve will be maintained fully open at the specific or known ECWT with a specific load. Operation at loads below the maximum design value will then be accurately evaluated with either a varying or constant CWT, including a selected minimum ECWT where the load continues to tail off. The refrigeration load with a varying ECWT $R_{VT}$ is then determined by:

$$R_{VT}=AX+B+AveF\times DT \quad \text{Equation C}$$

With no change in ECWT, DT will be either zero or fixed therefore this equation is useful for all conditions.

Equation C can be programmed into most PLCs or other computerized controllers. When programmed into computerized plant analyzer 300 and using the data generated by the temperature sensors and flow monitoring capabilities this constitutes a means to determine the actual refrigeration load using the quantity of rejected heat from chiller 1.

FIGS. 8 and 9 describes the development of equations to determine the efficiency of chiller 1 at different ECWT conditions and refrigeration load. The refrigeration load (X) is defined as a percent of the design maximum load for chiller 1. Efficiency is then shown as kW per percent of load. The two equations previously developed calculate the efficiency at 85° F. ($Y_{85}$) and 60° F. ($Y_{60}$).

$$Y_{85}=0.000455X^2-0.0077X+0.84 \qquad \text{Equation D}$$

$$Y_{60}=0.000341X^2-0.00412X+0.385 \qquad \text{Equation E}$$

By interpolating between the two equations the efficiency for any ECWT between 85° F. and 60° F. is described by the next equation.

$$E_{ECWT} = Y_{85} - (Y_{85} - Y_{60})\frac{1}{25}(DT) \qquad \text{Equation F}$$

The power demand for chiller 1 as kW for any load is then described by the equation.

$$P=XE_{ECWT} \qquad \text{Equation G}$$

Thus the theoretical real time power demand of chiller 1 can be displayed and used as a diagnostic tool when compared to the measured demand at the same moment in time. In the same manner power demand for a constant temperature operation is calculated and displayed as well providing a benchmark for power savings with a variable CW temperature control method.

The power for the other components of the chiller plant is measured as shown in FIG. 3A where this information is obtained from the electric motor drives 12 for condenser water pump 13 and cooling tower fan 16. Therefore performance of the chiller plant is collected and displayed as one number.

A benchmark for the power demand of cooling tower 14 for operation at a constant CW temperature is easily derived using public knowledge that cooling tower power demand directly correlates with the cooling load when the condenser water temperature of the cold water leaving the tower is maintained at a constant temperature equal to the system design temperature in a properly designed system. The basis for this correlation is full rated load at design conditions.

Therefore it is shown that real time power required to operate a chiller and a chiller plant can be collected and determined using a limited set of sensors. The chilled water load is also determined from these same sensors and a process calculation in the same real time. A benchmark calculation with operation at a constant entering condenser temperature is also determined. Therefore real time comparisons and savings calculations are collected and displayed to show that variable condenser water temperature provides significant operating savings over time for the entire plant.

FIG. 3B—ADDITIONAL EMBODIMENT

Figure 3B:
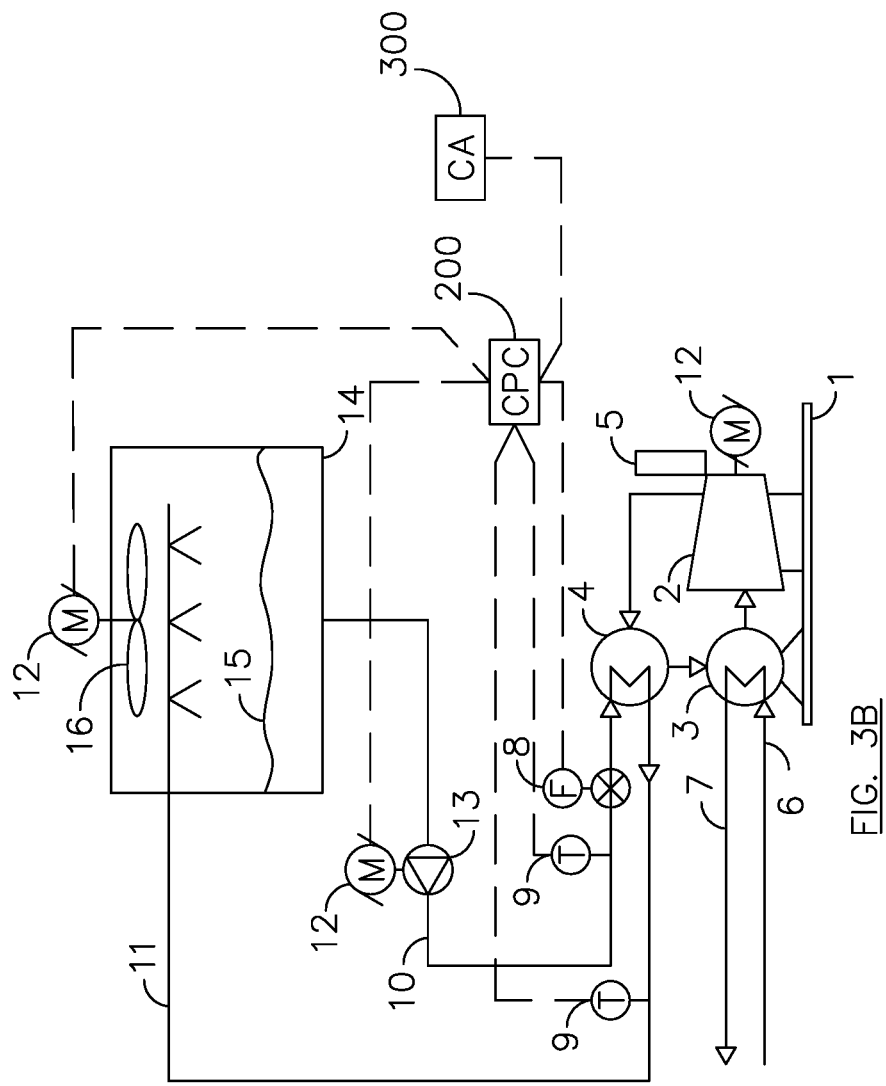
FIG. 3B shows a chiller plant diagram that that combines the computerized analyzer with a computerized plant controller as defined by one or more embodiments herein.

FIG. 3B describes the same chiller plant with one chiller 1, as shown in FIG. 3A. This embodiment includes a computerized plant controller 200 described in my previous U.S. Pat. No. 6,718,799 (2004) 'Method to Optimize Chiller Plant Operation'.

Controller 200 accepts inputs from temperature sensors 9 and flow meter 8 provides control outputs to the electric motor drives 12 for condenser water pump 13 and cooling tower fan 16. Controller 200 then provides a control signal to adjust the speed of the cooling tower fan 16 and therefore controls the CW temperature in response to the rejected heat load as measured by inputs described above.

Controller 200 provides a limited display of CW temperatures and CW flow rate. It has no capabilities to provide performance information. It performs a simple conservative linear calculation to determine the required CW temperature which it then uses as a control set point. This calculation is derived from generic data as observed from the study of similarly designed chillers.

The computerized analyzer 300 receives inputs directly from controller 200 then provides and displays the performance analysis previously described in the first embodiment.

The computerized analyzer 300 may be provided as a separate stand-alone device or it may be incorporated into one device along with the computerized plant controller 200.

The operating model for chiller 1 described in FIGS. 7A, 7B and 7C develops a precise entering condenser water temperature (ECWT) for operation at any load. A accurate calculation to determine the most efficient ECWT at any load is directly determined from this model of chiller 1 to be used as a variable control set point during operation by controller 200.

FIG. 7A Col 616 ECWT for each load condition was determined by trial and error as previously explained in the first embodiment thus establishing the optimum CW temperature for the operation of Chiller 1. By correlating the ECWT with either the actual load or the heat rejection quantity an operating equation can be developed to control the ECWT.

This new equation for ECWT is developed by plotting the values on an XY scatter chart where the numerical values on the Y or vertical axis represents the ECWT and the values on the X or horizontal axis represents the rejected heat. Therefore ECWT is the dependent axis and the rejected heat (or actual load) is the independent axis. Running a regression analysis for chiller 1 using the data in Col 616 (FIG. 7A) and Col 703 as the load the following equation fore ECWT is developed. For this example the regression analysis was done using Microsoft Excel but any suitable and readily available software will provide similarly accurate results.

$$ECWT=AX^2-BX+C \qquad \text{Equation I}$$

Thus, X=rejected heat quantity and ECWT for Chiller 1 is determined with the derived constants A, B and C. High and low limits for ECWT is established from the design criteria and as shown in FIGS. 7A, 7B and 7C. Therefore an operating formula that will provide an efficient variable set point to maximize energy savings using rejected heat that does not present runaway operation potential for chiller 1.

Therefore controller 200 can provide a control output to cooling tower fans 16 by using Equation I to determine a more precise CW set point for chiller 1. This set point is then a direct function of refrigeration load as determined by the model.

This formula is significantly more accurate than an empirical formula based on generic operations of similar chillers.

FIGS. 3C, 4A, AND 4B—ALTERNATIVE EMBODIMENTS

Figure 3C:
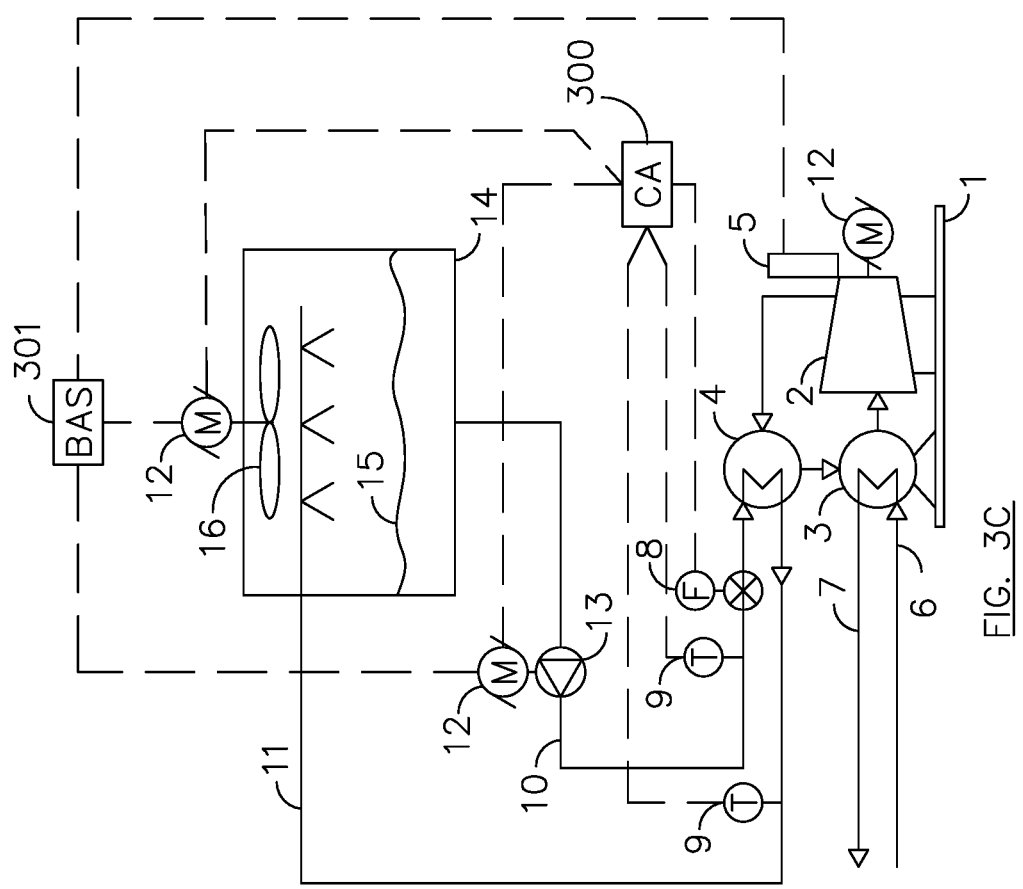
FIG. 3C shows a chiller plant diagram that includes a typical building automation system along with the computerized plant analyzer as defined by one or more embodiments herein.

FIG. 3C describes the same chiller plant with chiller 1, as shown if FIG. 3A. This embodiment shows a separate building automation and control system 301 provided by others. The computerized analyzer 300 is shown for clarity as a stand-alone system that will perform in conjunction with the generic BAS. Alternatively the functions of computerized analyzer 300 may be embedded within BAS 301.

Figure 4A:
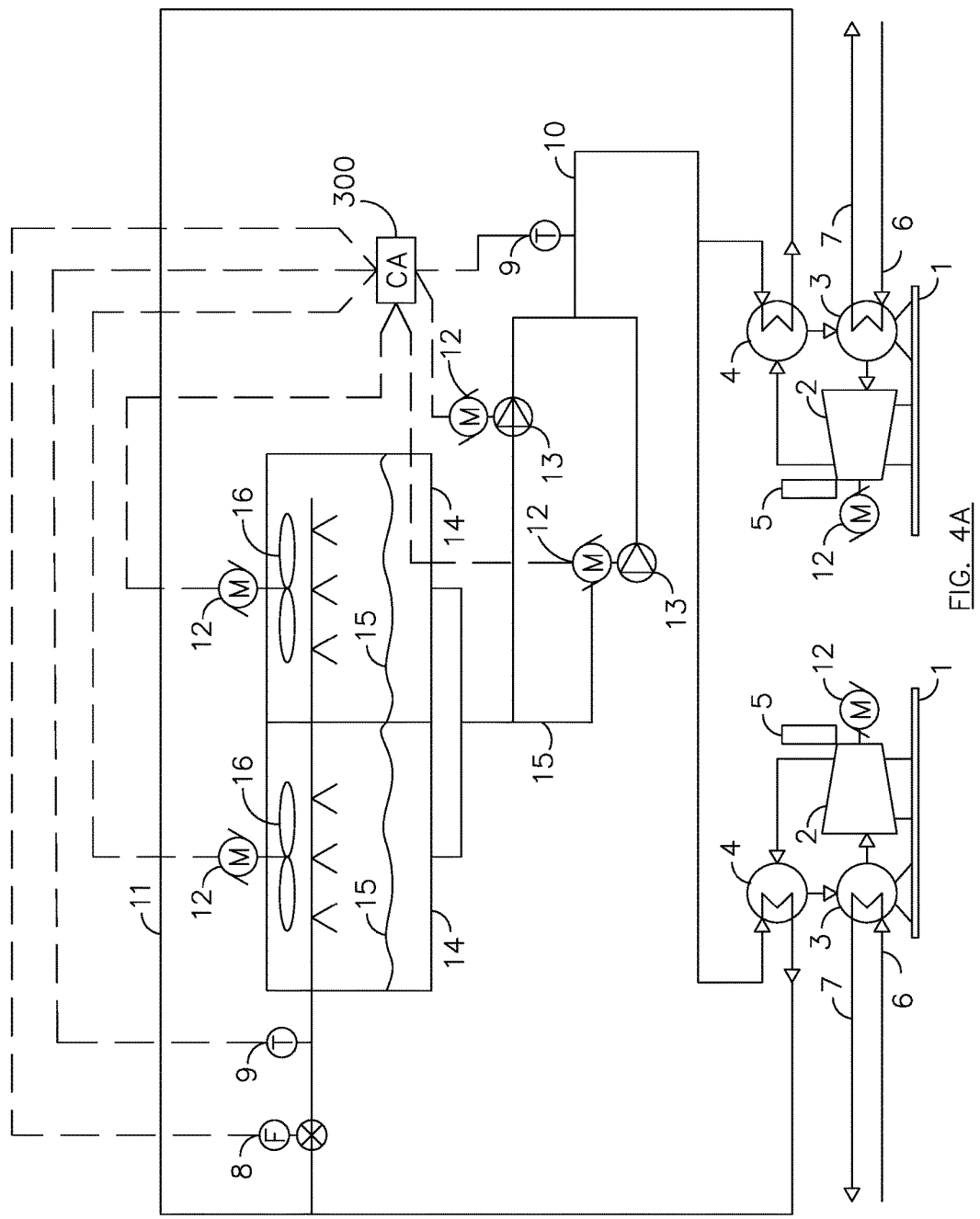
FIG. 4A shows a chiller plant diagram with multiple chillers and the computerized analyzer.
Figure 4B:
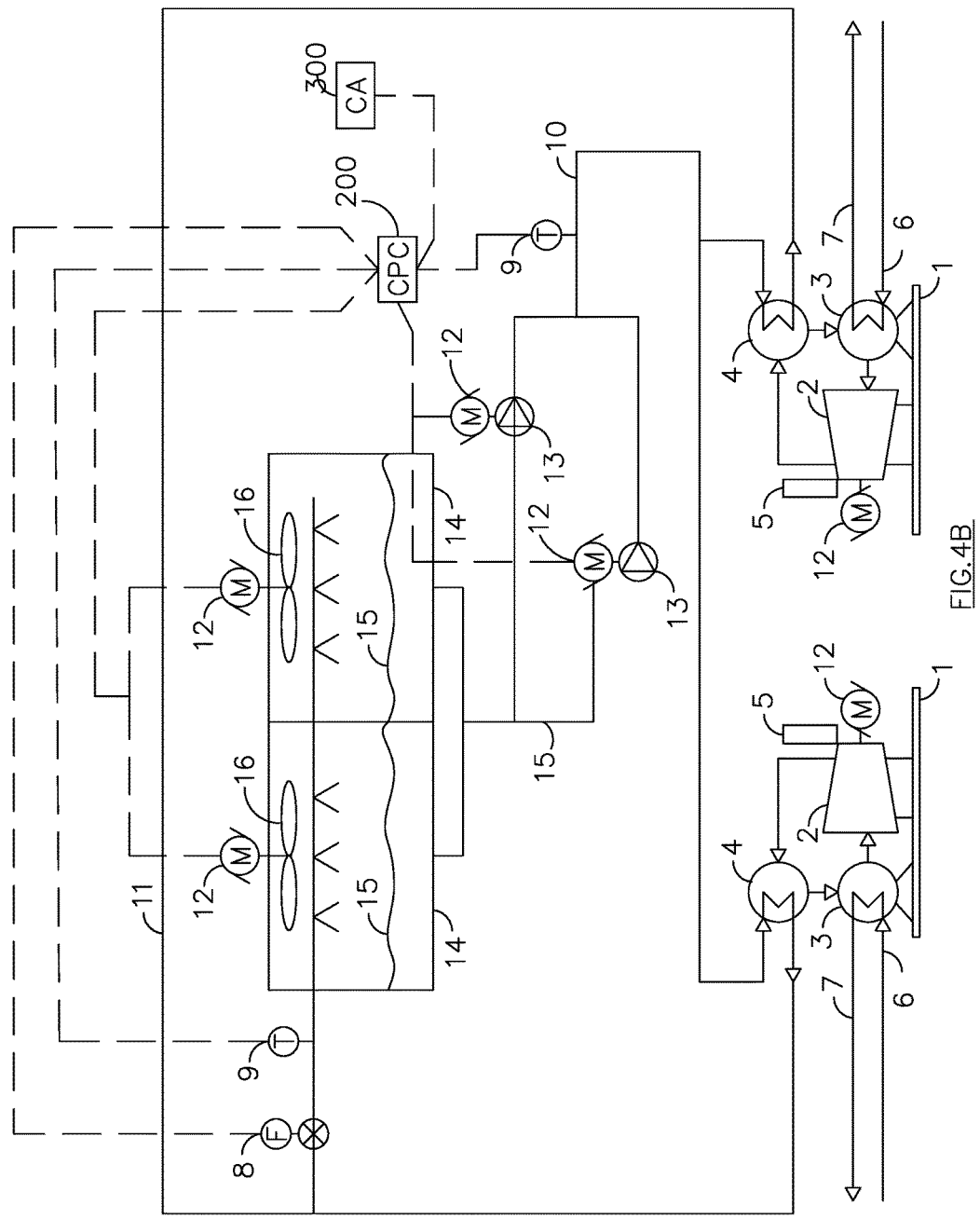
FIG. 4B shows a chiller plant diagram with multiple chillers a computerized plant controller and the computerized analyzer.

FIGS. 4A and 4B describe a chiller plant with multiple chillers, cooling towers and condenser pumps. Computerized analyzer 300 is configured to operate within these operations.

Alternative embodiments with various arrangements of control systems, multiple chillers and equipment are similarly evaluated as described in the first embodiment.

Therefore it is shown that real time power required to operate a chiller and a chiller plant can be collected and determined using a limited set of sensors for a complicated chiller plant with multiple sets of equipment, equipment that varies in size and capacity. The chilled water load is also determined from these same sensors and process calculation in the same real time. A benchmark calculation with operation at a constant entering condenser temperature is also determined. Therefore real time comparisons and savings calculations are collected and displayed to show that variable condenser water temperature provides significant operating savings over time for the entire plant.

ADVANTAGES

From the description above, a number of advantages of some embodiments of my method to measure the performance of a chiller and chiller plant become evident:
1. A limited number of sensors are required to provide useful performance measurements.
2. One set of sensors can be used to measure the performance of a single chiller or a plant with multiple chillers.
3. The same set of sensors can be used with a separate control function for condenser water control and plant optimization method.
4. Real time performance data is produced and displayed in useful and easy to understand metrics.
5. This method allows incorporation of specific and unique modeling parameters that provides powerful benchmark data points in real time.
6. The customized model that is provided for the specific chiller has an added benefit in that it provides an accurate control formula for the targeted chiller.
7. Useful diagnostic information is developed and can be readily displayed.
8. Promotes the use of condenser water reset control to optimize chiller operations to reduce energy use.
9. Promotes the use of rejected heat instead of actual load for condenser water reset control to prevent the potential of run-away operation by not allowing the chiller control point to fall below the operational curve.
10. Chillers and chiller plants can be compared across different platforms and different site locations.

CONCLUSIONS, RAMIFICATIONS, AND SCOPE

An optimal method to monitor and measure the performance of any chiller is provided by developing a detailed mathematical model for its operation. The model can be applied by measuring the rejected heat from the chiller with readily available sensors and monitoring equipment and computer systems. The required information to develop the model is nonproprietary, provided by its manufacturer as prescribed by government regulation, and provided for maintenance and operation needs to demonstrate that the chiller meets owner requirements. The method has the additional advantages in that:
  It provides benchmark data for real time analysis with benchmarks that match existing conditions;
  it permits comparison of theoretical parameters to actual operating parameters;
  it provides data for diagnostic use; and
  it provides an improved control sequence for condenser water reset.

Although the description above contains many specificities these should not be construed as limiting the scope of the embodiment but as merely providing illustrations of some of several embodiments. For example:
  the use of design or balancing measurements for condenser water flow rate in place of continuously measuring flow rate;
  alternative drives for the chiller including steam turbines;
  closed circuit cooling tower or liquid cooler;
  any suitable refrigerant besides R123;
  any computer system or programmable logic computer; and
  a dynamic model programmed into the computer system to include capability to manually adjust selected parameters or use inputs from the chiller to adjust certain parameters.

Thus the scope of the embodiments should be determined by the appended claims and their legal equivalents

I claim:

1. A method for predicting the performance of a chiller in real time over a range of refrigeration loads as a function of entering condenser water temperature and total rejected heat comprising;
  a. providing a first means for measuring entering condenser water temperature,
  b. providing a second means for measuring leaving condenser water temperature,
  c. calculating total rejected heat from the chiller into the leaving condenser water as a function of a fixed condenser water flow rate and the difference between the entering condenser water temperature and the leaving condenser water temperature,
  d. providing a third means to determine maximum feasible refrigerant flow from the chiller refrigerant condenser to the chiller refrigerant evaporator at any load and any entering condenser water temperature,
  e. providing a formula for calculating a predicted refrigeration load of the chiller as a function of total rejected heat from the chiller and the entering condenser water temperature.

2. The method of claim 1 further;
  a. providing a fourth means to measure flow rate of the entering condenser water,
  b. calculating total rejected heat from the chiller into the leaving condenser water as a function of a the measured flow rate of the entering condenser water and the difference between the entering condenser water temperature and the leaving condenser water temperature, wherein the predicted refrigeration load is determined for a range of flow rates.

3. The method of claim 1, further providing a formula to calculate a predicted power demand of the chiller at the predicted refrigerant load and any entering condenser water temperature.

4. The method of claim 1, further providing a fifth means to calculate a flow coefficient of liquid refrigerant flow from the chiller refrigerant condenser to the chiller refrigerant evaporator through a flow restrictor, wherein the maximum flow restriction defines the limitations of refrigerant flow under any refrigerant load and entering condenser water temperature.

5. A method for modeling liquid refrigerant flow through a flow restrictor (500) between a chiller refrigerant condenser and a chiller refrigerant evaporator in order to predict operating performance for a range of refrigeration loads and entering condenser water temperatures comprising:
   a. establishing a range of refrigeration loads (610) from some minimum load to a manufacturer's maximum design load for the chiller,
   b. calculating a maximum flow coefficient (640) at the maximum 100% refrigeration load of the chiller,
   c. determining the lowest possible condenser water temperature (616) for any refrigeration load (610) where the flow coefficient (640) matches but does not exceed the maximum flow coefficient,
   d. calculating the total rejected heat-% (656) for each given refrigeration load less than 100% as a function of the lowest possible condenser water temperature (616),
   e. Providing a formula based on a regression analysis of the refrigeration load with the matching total rejected heat-% and entering condenser water temperature,
      whereby the refrigeration load is predicted for any total rejected heat-% at the lowest possible entering condenser water temperature.

6. The method of claim 5 further comprising:
   a. calculating a corresponding total rejected heat-% (656) from the chiller for the corresponding refrigeration load (610),
   b. calculating an error F-% (702),
   wherein Equation C calculates refrigeration load as a percent of maximum design load as a function of the total rejected heat-%, the entering condenser water temperature, and
   Ave error F-% over the defined range.

7. The method of claim 5 further comprising:
   a. establishing an evaporator approach temperature (613) that matches the evaporator approach temperature of the chiller when new,
   b. establishing a condenser approach temperature (614) that matches the condenser approach temperature of the chiller when new,
   wherein the modeled refrigerant properties closely match the manufacturer's design properties for the chiller.

8. The method of claim 5 further comprising:
   establishing a leaving chilled water temperature (612) wherein the modeled liquid refrigerant flow and refrigerant properties are customized to match a plant operator's configuration for the chiller.

9. The method of claim 5 further comprising;
   establishing a temperature for compressed gas superheat (650) wherein the modeled liquid refrigerant flow and refrigerant properties accurately match the chiller specifications at maximum design refrigeration load.

* * * * *